United States Patent
Ratakonda et al.

(10) Patent No.: US 10,306,490 B2
(45) Date of Patent: May 28, 2019

(54) MULTI KPI CORRELATION IN WIRELESS PROTOCOLS

(71) Applicants: Balaji Ratakonda, Dallas, TX (US); John P. Curtin, Richardson, TX (US); Vignesh Janakiraman, Plano, TX (US)

(72) Inventors: Balaji Ratakonda, Dallas, TX (US); John P. Curtin, Richardson, TX (US); Vignesh Janakiraman, Plano, TX (US)

(73) Assignee: NetScout Systems texas, LLC, Plano, TX (US)

( * ) Notice: Subject to any disclaimer, the term of this patent is extended or adjusted under 35 U.S.C. 154(b) by 147 days.

(21) Appl. No.: 15/001,987

(22) Filed: Jan. 20, 2016

(65) Prior Publication Data

US 2017/0208487 A1 Jul. 20, 2017

(51) Int. Cl.
 *H04L 12/26* (2006.01)
 *H04W 24/04* (2009.01)
 *H04L 12/24* (2006.01)

(52) U.S. Cl.
 CPC .......... *H04W 24/04* (2013.01); *H04L 41/064* (2013.01); *H04L 41/0631* (2013.01); *H04L 41/5038* (2013.01); *H04L 43/0817* (2013.01); *H04L 43/18* (2013.01)

(58) Field of Classification Search
 CPC . H04W 24/04; H04W 28/0268; H04W 28/04; H04W 84/04
 USPC .......................... 370/241, 245, 250, 310, 349
 See application file for complete search history.

(56) References Cited

U.S. PATENT DOCUMENTS

| | | | |
|---|---|---|---|
| 6,415,193 B1* | 7/2002 | Betawar | G05B 19/41865 700/121 |
| 8,140,454 B2* | 3/2012 | Bullen | G06N 7/005 706/10 |
| 8,948,369 B2* | 2/2015 | Shaffer | H04M 3/5175 379/265.01 |
| 8,972,467 B2* | 3/2015 | Heinrich | H04L 67/1095 345/661 |
| 9,031,561 B2* | 5/2015 | Nuss | H04W 24/02 455/436 |
| 9,128,912 B2* | 9/2015 | Kamiya | G06F 17/2205 |
| 9,325,568 B2* | 4/2016 | Racz | H04L 41/0631 |

(Continued)

OTHER PUBLICATIONS

He Yan et al: "G-RCA", IEEE/ACM Transactions on Networking, IEEE/ACM, New York, NY, US, vol. 20, No. 6, Dec. 31, 2012 (Dec. 31, 2012), pp. 1734-1747, XP058029874, ISSN: 1063-6692, DOI: 10.1109/TNET.2012.2188837 *chapters I and II, pp. 1734-1741 * * figures 1-4 * * tables I, II *.

(Continued)

*Primary Examiner* — Dmitry Levitan
(74) *Attorney, Agent, or Firm* — Locke Lord LLP; Scott D. Wofsy; Christopher J. Capelli

(57) ABSTRACT

A network monitoring system is provided that includes a processor, a memory coupled to the processor and a database that includes key performance indicator (KPI) records for monitoring a wireless communication system. The network monitoring system further includes a rules engine configured and operable to store in the memory KPI rules associated with at least one rule set. The network monitoring system also includes an analysis engine configured and operable to identify a list of root causes identifying failure events based on the at least one KPI rule in the at least one rule set.

11 Claims, 5 Drawing Sheets

(56) References Cited

U.S. PATENT DOCUMENTS

| | | | |
|---|---|---|---|
| 2002/0154751 A1* | 10/2002 | Thompson, III | G06Q 10/10 379/114.01 |
| 2013/0185591 A1 | 7/2013 | Ge et al. | |
| 2013/0290525 A1* | 10/2013 | Fedor | H04L 41/147 709/224 |
| 2015/0163271 A1* | 6/2015 | Handurukande | H04L 65/80 709/231 |
| 2015/0378805 A1 | 12/2015 | Nakano et al. | |
| 2016/0065419 A1* | 3/2016 | Szilagyi | H04L 41/5067 709/224 |
| 2016/0087856 A1* | 3/2016 | Groenendijk | H04L 41/5009 370/242 |
| 2016/0381580 A1* | 12/2016 | Kwan | H04W 24/08 370/252 |
| 2017/0126476 A1* | 5/2017 | Curtin | H04L 41/0631 |

OTHER PUBLICATIONS

Peter Szilagyi et al: "An Automatic Detection and Diagnosis Framework for Mobile Communication Systems", IEEE Transactions on Network and Service Management, vol. 9, No. 2, Jun. 30, 2012 (Jun. 30, 2012), pp. 184-197, XP055249170, US ISSN: 1932-4537, doi: 10.1109/tnsm.2012.031912.110155 * chapter III, pp. 186-192 * * figures 1, 2, 3, 6 *.

Extended European Search Report received from the European Patent Office dated May 17, 2017 for Application No. EP 17152519.9.

* cited by examiner

MULTI KPI CORRELATION IN WIRELESS PROTOCOLS

FIELD OF THE INVENTION

The present invention relates, in general, to network monitoring, and more particularly to multi KPI correlation in wireless networks.

BACKGROUND OF THE INVENTION

Network and customer experience monitoring solutions are widely accepted standards for the operations of carrier service provider networks across both fixed networks (e.g., Cable/Multi System Operator (MSO), IP broadband such as Digital Subscriber Line (DSL), Fiber To Home (FITH), etc.) and mobile networks (e.g., second and a half generation (2.5G), third generation (3G), fourth generation (4G), 3GPP Long Term Evolution (LTE), etc.). These systems monitor network traffic via probe devices, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business process.

A few examples of KPIs include Handover Success (by node, location, etc.), Call Drop Ratio (by node, handset, etc.), Application Usage (by node, subscriber, etc.), Subscriber Count (by location, demographic, etc.), and the like.

Contemporary telecommunication network environments typically involve multiple technologies, multiple protocols, and interconnections to a wide variety of networks. More complex network environment means that the potential for problems in internetworks is high, and the source of problems is often elusive. Thus, there is a strong demand for robust diagnostic tools for troubleshooting networking failures.

Currently, there are performance monitoring tools which monitor a wide range of KPIs. While such tools are useful in identifying certain network issues, at any given moment, there may be several hundreds of KPIs that need to be analyzed over a short period of time. Thus, existing monitoring tools are limited in their diagnostic capabilities since in order to identify a root cause of any failure it is necessary to manually analyze potentially hundreds of KPIs and correlate the different outliers. This is very time consuming.

It is to be appreciated that when a network problem arises, it can be rooted anywhere in the networks. To troubleshoot network issues quickly, it is imperative to have automated analysis scheme capable of correlating multiple KPIs across multiple interfaces and protocols.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a network monitoring system is provided that includes a processor, a memory coupled to the processor and a database that includes a plurality of key performance indicator (KPI) records for monitoring a wireless communication system. The network monitoring system further includes a rules engine configured and operable to store in the memory KPI rules associated with at least one rule set. The network monitoring system also includes an analysis engine configured and operable to identify, using the processor, a list of root causes of a failure for one or more of the transactions based on the at least one KPI rule in the at least one rule set.

In another aspect, a method for automatically identifying root causes of a failure in a wireless communication system is provided. Rules associated with a plurality of key performance indicator (KPI) records for monitoring a wireless communication system are generated. Failures in the wireless communication system are identified. Likely root causes associated with the identified failures are identified. The likely root causes are analyzed by correlating some of the KPI records based on the generated rules.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
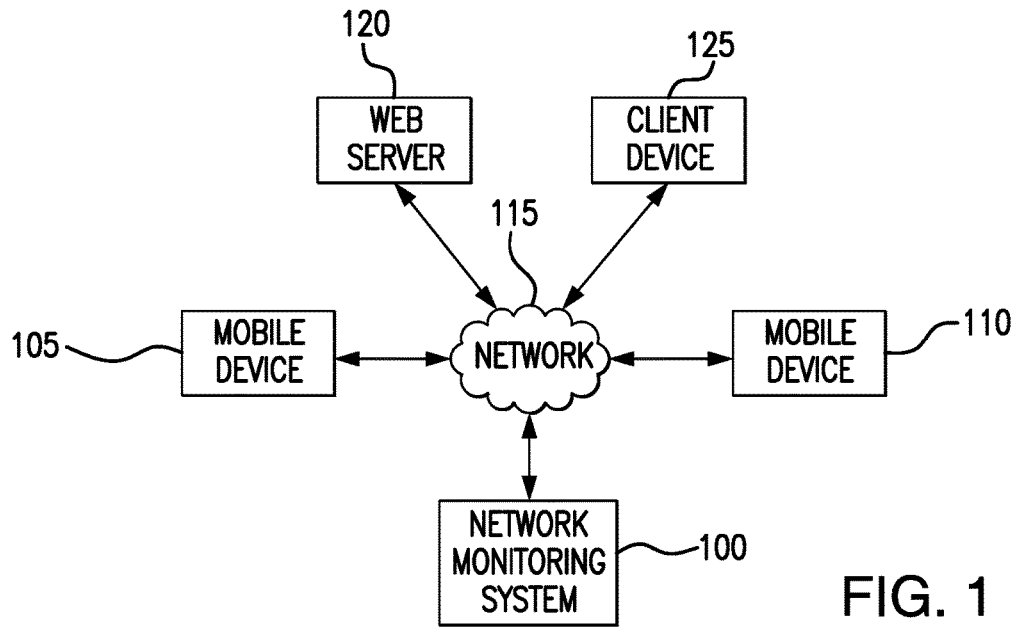
FIG. 1 is a block diagram of a network monitoring system according to some embodiments of the present invention.

The below illustrated embodiments are directed to a system and method for multi KPI correlation in wireless protocols in which a component or a feature that is common to more than one illustration is indicated with a common reference. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably utilized in conjunction with a software algorithm, program or code residing on computer useable medium having control logic for enabling execution on a device having a computer processor. The device typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the certain embodiments described herein. Thus, the certain embodiments are not to be understood to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

FIG. 1 illustrates a block diagram of a network monitoring system. As illustrated, mobile devices 105 and 110 may be capable of transmitting and receiving data (e.g., web pages, audio, video, etc.) to and from each other over network 115. Also, web server 120 may be configured to provide one or more web pages to client device 125 through network 115. In various embodiments, network 115 may include any suitable wireless/mobile computer or data network including, for example, a 3G, 4G, or LTE wireless networks, etc.

Communications between mobile devices 105 and 110, as well as communications between web server 120 and client device 125, may be monitored by network monitoring system 100, as data packets comprising those communications pass through wireless network 115 spanning multiple interfaces.

As such, network monitoring system 100 may include a network monitor or analyzer, a packet sniffer, a probe, or the like, coupled to network 115. Protocols used to enable communications taking place in FIG. 1 may be selected, for instance, based upon the type of content being communicated, the type of wireless network 115, and/or the capabilities of devices 105, 110, and/or 125. Examples of types of protocols that may be used include, but are not limited to, hypertext transfer protocol (HTTP), HTTP Timing Protocol (HTP), HTTP date headers or RESTFUL APIs using, for example, the HTTP protocol as a synchronization protocol, Transmission Control Protocol (TCP), Real Time Streaming Protocol (RTSP), or more commonly, Real Time Messaging Protocol (RTMP), User Datagram Protocol (UDP) and Real Time Transport Protocol (RTP).

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track a plurality of KPIs, such as, but not limited to, signaling plane delay KPIs, cell congestion levels KPIs, etc. The signaling plane delay KPI measures or monitors the response time in setting up a service for an end user. Examples of Signaling Plane Delay KPIs include the delay endured by a User Equipment (UE) to setup a Radio Resource Control (RRC) connection, or the procedure delay in adding or deleting the radio links during hand-off procedures when a UE moves between radio cells. Cell congestion levels may be determined, for example, by identifying a Radio Access Bearer (RAB) connection rejection or release having a RRC cause value corresponding to congestion, re-establishment release or pre-emptive release. Overall, the plurality of tracked KPIs provides a comprehensive view of the network state.

Various embodiments of the present invention further contemplate that network monitoring system 100 can optionally further provide other services, such as, but not limited to, an analysis scheme whereby all relevant KPIs associated with a user-identified failure and related to a subscriber activity spanning multiple interfaces are examined to provide precise root cause failure identification of the session. Generally speaking, such analysis scheme may utilize a KPI rules engine to create a standard set of KPI analysis rules which will be used by an analyzer module coupled to the rules engine to determine a prioritized list of most likely root causes and can be further tuned to meet individual customer needs.

According to some embodiments, network monitoring system 100 may be configured to automatically sift through and correlate relevant transactions and corresponding KPIs across multiple interfaces and protocols to automatically identify one or more likely root causes. A myriad of root causes might be in-play during any given sampling window. For example, a failure of a particular interface can cause multiple error messages to appear in different subscriber session records that represent the output of various wireless network transactions, thereby creating interleaved sequences of events in the respective subscriber session records. Each event may be associated with a corresponding KPI. Various embodiments of the present invention contemplate that a KPI root cause analyzer 225 described below may employ a scoring technique to automatically identify a list of most likely causes of a network failure. Automated troubleshooting systems can benefit greatly from identification of most likely causes, as opposed to individual error messages, as this reduces noise (i.e., erroneous, meaningless, missing, incomplete, or difficult-to-interpret information), compresses the data and facilitates a more accurate representation of all transactions in the wireless network.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by web server 120 through a stand-alone or web-based client application. Web server 120 may include any server or computer system capable of delivering content to device 125.

Although only four devices 105, 110, 120, and 125 are shown in FIG. 1, it will be understood wireless network 115 may comprise any number of elements (i.e., nodes and endpoints). For example, in some implementations, wireless network 115 may include nodes or endpoints that may be components in a 3G or 4G wireless network, such as a Serving General Packet Radio Service (GPRS) Support Node (SGSN), Gateway GPRS Support Node (GGSN) or Border Gateway in a GPRS network, Packet Data Serving Node (PDSN) in a Code Division Multiple Access (CDMA) 2000 network, a Mobile Management Entity (MME), eNodeB, Serving Gateway (SGW), Home Subscriber Server (HSS) in a LTE network or any other core network nodes or routers that transfer data packets or messages between endpoints. Moreover, it will be understood that such nodes and endpoints may be interconnected in any suitable manner, including being coupled to one or more other such nodes and/or endpoints.

As noted above, many packets traverse wireless network 115 between endpoints. These packets may represent many different sessions and protocols. For example, if mobile device 105 is used for a voice or video call, then it may exchange Voice over Internet Protocol (VoIP) or Session Initiation Protocol (SIP) data packets with a SIP/VoIP server (not shown) using RTP. If mobile device 105 is used to send or retrieve email, it may exchange Internet Message Access Protocol (IMAP), Post Office Protocol 3 Protocol (POP3), or Simple Mail Transfer Protocol (SMTP) messages with an email server (not shown). If client device 105 is used to download or stream video, it may use RTSP to establish and control media sessions with web server 120. Alternatively, the user at mobile devices 105 and 110 or client device 125 may access a number of websites using HTTP protocol to exchange data packets with web server 120. It will be understood that packets exchanged between devices may conform to numerous other protocols now known or later developed.

In a typical situation, approximately one percent of the packets traversing wireless network 115 carry control data, such as information for setting-up, managing or tearing-down calls or sessions between endpoints. The other ninety-nine percent of the packets carry user data, such as actual voice, video, email or information content to and from connected devices.

In various embodiments, network monitoring system 100 may be used to monitor the performance of wireless network 115. To that end, monitoring system 100 may be configured to capture packets that are transported across wireless network 115. In some embodiments, packet capture devices may be non-intrusively coupled to network links to capture substantially all of the packets transmitted across the links. It will be understood that, in an actual network, there may be dozens or hundreds of physical, logical or virtual connections and links between nodes. In some cases, network monitoring system 100 may be coupled to all or a high percentage of these links. In other embodiments, monitoring system 100 may be coupled only to a portion of wireless network 115, such as only to links associated with a particular carrier or service provider. The packet capture devices may be part of network monitoring system 100, such as a line interface card, or may be separate components that are remotely coupled to network monitoring system 100 from different locations.

Monitoring system 100 may include one or more processors running one or more software applications that collect, correlate and/or analyze media and signaling data packets from wireless network 115. Monitoring system 100 may incorporate protocol analyzer, session analyzer, and/or traffic analyzer functionality that provides OSI (Open Systems Interconnection) Layer 2 to Layer 7 troubleshooting by characterizing network traffic by links, nodes, applications, service types and servers on wireless network 115. In some embodiments, these operations may be provided, for example, by the IRIS® toolset available from NetScout Inc., although other suitable tools may exist or be later developed. The packet capture devices coupling network monitoring system 100 to wireless network 115 may be high-speed, high-density probes that are optimized to handle high bandwidth IP traffic, such as the GEOPROBE® G10, also available from NetScout, Inc., although other suitable tools may exist or be later developed. A service provider or network operator may access data from monitoring system 100 via a user interface station having a display or graphical user interface, such as the IRISVIEW configurable software framework that provides a single, integrated platform for several applications, including feeds to customer experience management systems and operation support system (OSS) and business support system (BSS) applications, which is also available from NetScout, Inc., although other suitable tools may exist or be later developed.

Monitoring system 100 may further comprise an internal or external memory for storing captured data packets, user session data, and configuration information. Monitoring system 100 may capture and correlate KPIs associated with specific data sessions. In some embodiments, a rules engine determines a customized set of KPIs that need to be correlated. These KPIs may be captured in an array or other forms of individual readable output, such as a "Comma-Separated Value" (CSV) data file. The resulting CSV file or other individual readable output can be used to compute score weighting values for each KPI record, as described below.

Figure 2:
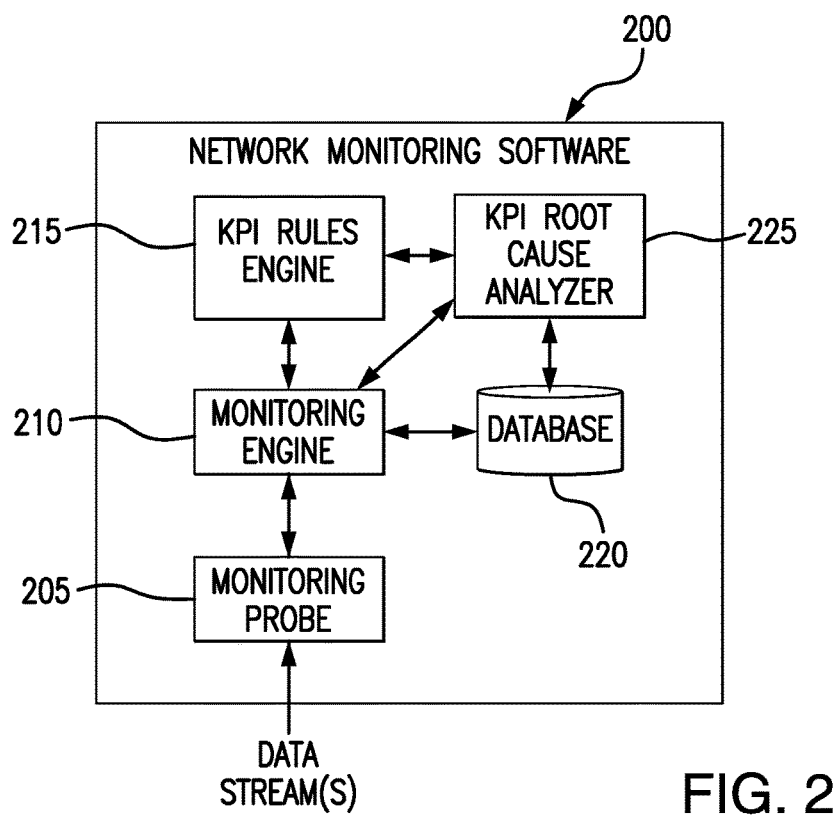
FIG. 2 is a block diagram of a network monitoring software program according to some embodiments of the present invention.

Turning now to FIG. 2, a block diagram of a network monitoring software program is depicted. In some embodiments, network monitoring software 200 may be a software application executable by monitoring system 100 of FIG. 1. As previously noted, a plurality of communication sessions or data streams may be transmitted across wireless network 115 between devices 105, 110, 120, and/or 125. Such communications may be streamed over HTTP, RTMP, RTP, or any other suitable protocols.

Monitoring probe 205 may be configured to capture data packets from wireless network 115, including, for example, data from one or more HTTP requests or sessions. As such, monitoring probe 205 may determine subscriber identifying information for the captured data packets and may combine related data into session or request records. Monitoring probe 205 may then feed session records and captured packet data to monitoring engine 210. In some cases, a session record may include multiple segments that are provided to monitoring engine 210 periodically while an associated session is active. Monitoring engine 210 may in turn be configured to extract session data from each session record and to identify the protocol for each session record.

Session data may include a plurality of PDUs corresponding to a plurality of different protocols stored to database 220. In other words, the plurality of PDUs comprises a plurality of signaling messages exchanged between one or more elements of wireless communication system 115. Database 220 may also store subscriber information and client device data.

Network monitoring software 200 may allow the service provider for wireless network 115 to collect data from various network access requests or established network sessions concurrently or simultaneously. Data for multiple requests or sessions is stored in database 220, which allows the service provider to track each service or to extract system-wide parameters. For example, monitoring probe 205 and/or monitoring engine 210 may identify the type of protocol being used for each session by analyzing the header of one or more data packets for that session.

Monitoring probe 205 and/or monitoring engine 210 may also track network resources available to each service session, and may identify resource changes that occur in real-time. At least in some embodiments, session monitoring engine 210 may use the collected information to generate a plurality of KPIs for the overall network. The KPIs may include, for example, indicators for accessibility, retainability, integrity, availability, mobility, etc.

Further, as noted above, network monitoring system 100 may employ a set of KPI rules to automatically identify a list of likely causes for the identified failure. In an embodiment of the present invention, different sets of KPI rules may apply to different types of traffic. Each KPI rule may in turn dictate a specific set of KPIs that will be used in subsequent processing such as, for example, the analysis and correlation of various individual KPIs based on a specific rule and/or ruleset or the like. Additional examples of utilized KPI data may include, but are not limited to, connection establishment indicators, service performance indicators, authentication indicators, network congestion indicators, connection maintenance indicators, service completion indicators, service quality indicators, and/or service availability indicators.

As noted above, according to an embodiment of the present invention, network monitoring software 200 also includes a KPI rules engine 215. KPI rules engine 215 includes one or more software modules or components that manages and automates the aforementioned KPI rules. For instance, KPI rules engine 215 evaluates all calculated KPIs and identifies one or more KPIs needed to be correlated based on the evaluation of provided network failure data. Generally, one advantage of a rules engine is the separation of the rules from the underlying application code. With the rules separated from the application code, KPI rules engine 215 allows the users to modify the rules frequently without the help of technical staff and hence, allowing network monitoring software 200 to be more adaptable with the dynamic rules. The KPI rules may be grouped or partitioned into one or more rule sets, where each rule set contains one or more rules. Then KPI rules engine 215 executes the rules according to the execution order. In one embodiment, a model of the execution order is generated and loaded into KPI rules engine 215.

KPI rules engine 215 may also be configured to exchange information with a KPI root cause analyzer 225 as described below with respect to FIG. 3. The exemplary KPI root cause analyzer 225 of FIG. 2 analyzes the KPI data of interest based on an appropriate rule/ruleset and utilizes KPI scoring mechanism to determine and/or identify the most likely root cause(s) of network performance problems.

Figure 3:
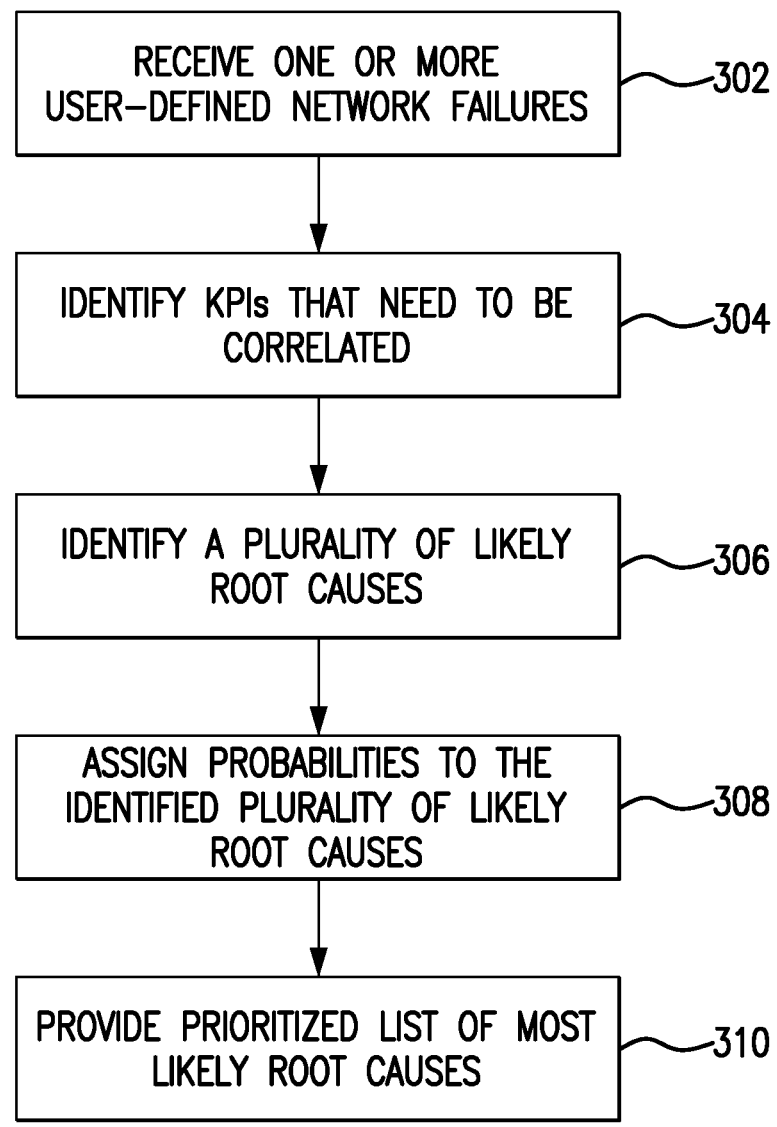
FIG. 3 is a flowchart of a method for automatically identifying root causes of a failure in a wireless communication system using KPI correlation, according to some embodiments of the present invention.

Referring now to FIG. 3, a flowchart of a method for automatically identifying failures in wireless networks using KPI correlation is provided, in accordance with embodiments of the present invention. Before turning to description of FIG. 3, it is noted that the flow diagram in FIG. 3 shows examples in which operational steps are carried out in a particular order, as indicated by the lines connecting the blocks, but the various steps shown in this diagram can be performed in any order, or in any combination or subcombination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product. In some embodiments, the method described below may be performed, at least in part, by one or more components of network monitoring system 100.

According to an embodiment of the present invention, at step 302, monitoring engine 210 may provide on demand activation of the automated network failure root-cause analysis. In some embodiments, proactive service assurance can aid in lowering the impact and the prevention of failures or outages on communications network. In one embodiment, one or more network failures may be automatically detected based on data collected by monitoring probes 205. For example, monitoring probes 205 can collect network data indicating one or more network failures (e.g., alarms and/or traps) by monitoring one or more network elements or systems of wireless network 115. In an alternative embodiment, one or more network failures may be identified by a user while evaluating a plurality of subscriber session records stored in database 220 for long-term storage.

In certain embodiments, KPI root cause analyzer 225 may be configured, at step 304, to dynamically obtain from KPI rules engine 215 a rule set related to the one or more network failures identified by monitoring engine 210 in step 302. In one embodiment, KPI rules engine 215 may identify an appropriate rule set by mining KPI data stored in database 220, for example, by using learning algorithms to identify KPIs that are most significantly associated with identified network failure(s). In one embodiment, KPI rules engine 215 may be configured to obtain a timestamp that identifies a relative time when the identified failure(s) occurred. This timestamp may be used by KPI rules engine 215 to determine which KPI data to read from database 220. The timestamp can also be used in comparisons performed at the network 100 to determine if dependencies from other transactions are possible, if the transaction might be dependent on another transaction or if conflicting transactions have taken place. It should be noted that because the end-to-end (or user perceived) network performance depends on the interaction of many protocols at different interfaces and on various protocol layers, various KPIs may also correspond to different protocols and different interfaces. In some embodiments, each rule set matches one or more transactions with one or more KPIs for a given protocol in the wireless communication system 115.

Figure 4A:
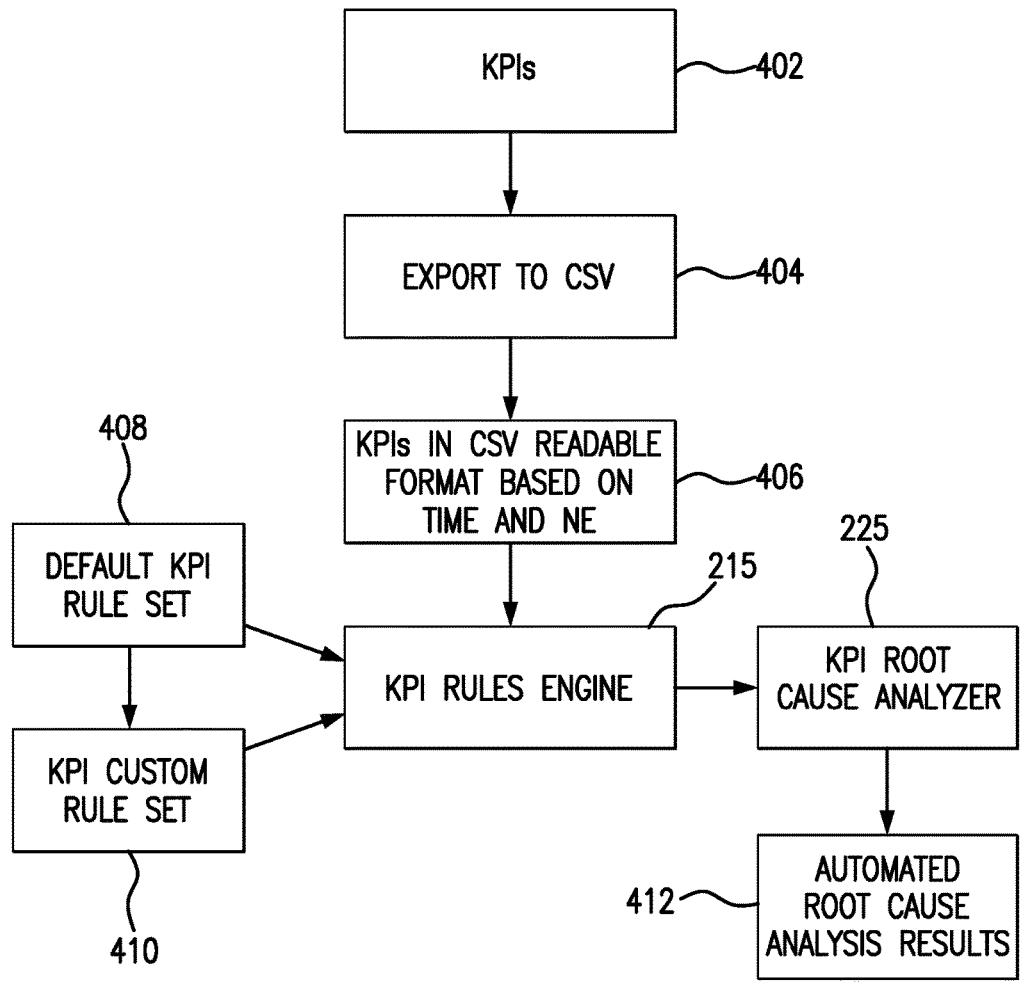
FIG. 4A illustrates an exemplary methodology for utilizing KPI rules for automated identification of most likely root causes, according to some embodiments of the present invention.

FIG. 4A illustrates an exemplary methodology for utilizing KPI rules for automated identification of most likely root causes, according to some embodiments of the present invention. As shown in FIG. 4A, KPIs 402 may be stored in database 220 as a plurality of KPI records. These KPI records may be accessed by KPI rules engine 215 in various formats. In one embodiment, database 220 may be configured and operable to export 404 one or more KPI records as a comma separated variable (CSV) file based, for example, on a time period associated with the identified failure and/or based on one or more network elements of the wireless communication system associated with the identified failure. In alternative embodiments KPI records may be exported as various data structures in text files, eXtensible Markup Language (XML) documents, Virtual Storage Access Method (VSAM) files, flat files, Binary files, etc.

At least in some embodiments of the present invention, KPI rules engine 215 may include a natural language enhanced user interface. As discussed above, KPI rules engine 215 broadly refers to a software module that manages KPI rules. For instance, some embodiments of the KPI rules engine 215 may store KPI rules, evaluate KPI rules, and execute KPI rules based on results of rule evaluation. In some embodiments, one or more rule templates in a natural language are generated from one or more predefined sentences. The predefined sentences can be written in the natural language syntax as well using a plain grammar format. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc. In some embodiments, the predefined sentences are KPI rules previously submitted by users. The predefined sentences may also include KPI records provided by exported CSV-readable file. Accordingly, in one embodiment, a user interface of KPI rules engine 215 may be created using the rule templates to allow a user to compose rules for correlation of specific KPIs by KPI rules engine 215. For example, as shown in FIG. 4A, users may predefine a global KPI rule set 408 that searches for correlation between specific KPIs. Global KPI rule set 408 may include one or more predefined sentences that can be written in the natural language syntax using a plain grammar format. Furthermore, in one embodiment of the present invention, KPI rules engine 215 may be configured and operable to generate a customized KPI rule set 410 based on the global KPI rule set 408 and based on the KPI records 406 provided in the exported CSV readable file.

According to an embodiment of the present invention, in order to perform a root cause analysis, at step 306, KPI root cause analyzer 225 is configured to identify one or more likely root causes based on the customized rule set 410 identified in step 304 and associated with the failure(s) identified in step 302. Table 1 below illustrates exemplary customized rule set 410 for different wireless protocols provided by KPI rules engine 215 in accordance with aspects of the present invention:

TABLE 1

| Root Cause Description | KPIs | | |
|---|---|---|---|
| Users not being authenticated | S1-MME PDN Connection Rejects ABOVE 2% | GTP-V2 Create Session Failures ABOVE 2% | S6b AAA Failure ABOVE 2% |
| SGW Resource Unavailable | S1-MME PDN Connection Rejects ABOVE 2% | GTP-V2 Create Session Failures ABOVE 2% | S6b AAA Failure BELOW 2% |
| Inter MME Handover Failure | Tracking Area Update Reject ABOVE 1% | S10 Context Failures ABOVE 4% | |

In this case, if users complain about their inability to connect to LTE network, the exemplary customized rule set 410 specifies three different potential root causes: i) users not being authenticated by the network, ii) SGW resource unavailable and iii) inter MME handover failure. The exemplary customized rule set 410 presented in table 1 above also specifies a plurality of KPIs that can be used for correlation to determine likelihood of each of the potential root causes. Notably, at least some KPIs may be indicative of few different issues. For example, in table 1 a relatively high number (e.g., over 2%) of PDN connection reject messages sent over S1-MME interface and unusually high number of GTPv2 create session failures may be indicative of two different root causes. In this scenario, KPI root cause analyzer 225 may utilize a third KPI as a distinguishing factor. In the exemplary customized rule set 410 presented in table 1 such distinguishing factor is a KPI indicative of connection failures with authentication, authorization, and accounting (AAA) server communicated over the S6b interface (interface between the 3GPP AAA and the PDN gateway) if a 3GPP AAA is deployed. Also, as shown in table 1, KPI root cause analyzer 225 may determine whether users are unable to connect to the LTE network due to inter MME handover failure by correlating KPIs indicative of tracking area update reject messages and context failure messages communicated over S10 interface.

Next, at step 308, once a plurality of potential root causes of specified/detected network failures is identified, KPI root cause analyzer 225 assigns probability scores to each of the identified root causes based on a combination of factors. In other words, since multiple root causes might be in play, KPI root cause analyzer 225 may employ a scoring mechanism described below to determine likelihood that each potential cause actually caused the reported network problems.

Table 2 below illustrates an exemplary scoring mechanism that may be implemented by KPI root cause analyzer 225 in accordance with aspects of the present invention:

TABLE 2

| Root Cause Description | KPIs | | | KPI Score | Probability Score |
|---|---|---|---|---|---|
| Users not being authenticated | 2% = 100,000 Actual # of rejects = 150,000 Threshold excess score (C1) = 150,000 − 100,000 = 50,000 | 2% = 50,000 Actual # of failures = 75,000 Threshold excess score (C2) = 25,000 | 2% = 40,000 Actual # of failures = 70,000 Threshold excess score (C3) = 30,000 | KPI score = (3*C3 + 2*C2 + 1*C1)/6 = 31,600 | KPI Score/Sum of all KPI scores = 25% |
| SGW Resource Unavailable | 2% = 100,000 Actual # of rejects = 150,000 Threshold excess score (C1) = 50,000 | 2% = 50,000 Actual # of failures = 75,000 Threshold excess score (C2) = 25,000 | 2% = 40,000 Actual # of failures = 40,000 Threshold excess score (C3) = 0 | KPI score = (3*C3 + 2*C2 + 1*C1)/6 = 16,600 | 15% |
| Inter MME Handover Failure | 1% = 1,000,000 Actual # of rejects = 1,100,000 Threshold excess score (C1) = 100,000 | 4% = 10,000 Actual # of rejects = 75,000 Threshold excess score (C2) = 65,000 | | KPI score = (2*C2 + 1*C1)/3 = 76,667 | 60% |

In one embodiment, the scoring mechanism includes three separate steps. In a first step, KPI root cause analyzer 225 determines a threshold excess score (C1-C3) for each KPI associated with the identified root causes by calculating the actual number of failures exceeding thresholds specified in table 1 (i.e., 2% thresholds for PDN connection reject messages sent over S1-MME interface and GTPv2 create session failures). The second step of the scoring mechanism involves calculation of KPI scores based on a number of detected failures exceeding a predefined threshold (threshold excess score) in the wireless communication system for each of the one or more identified root causes. As shown in table 2, KPI root cause analyzer 225 assigns a weight value to each threshold excess score as the depth of KPI records used for correlation increases. In other words, KPI root cause analyzer 225 multiplies each threshold excess score by an integer number such that the integer increases follow a portion of a Fibonacci number series. In a Fibonacci series, the kth number (with the exception of the first and second numbers which both equal one) in the series will equal the sum of the (k−1) and (k−2) numbers. Thus, a Fibonacci series is as follows: 1, 1, 2, 3, 5, 8, 13, 21, etc. In alternative embodiment, weight values for threshold excess score may increase linearly. According to an embodiment of the present invention, the third and final step of the scoring mechanism involves generation of probability score as a ratio of each KPI score to the sum of all KPI scores, as shown in table 2. Advantageously, the probability score is indicative of likelihood that each potential cause actually caused the reported network problems. For example, in table 2 above, the third listed potential cause (inter MME handover failure) has approximately 60% likelihood of causing users' inability to connect to an LTE network.

Figure 4B:
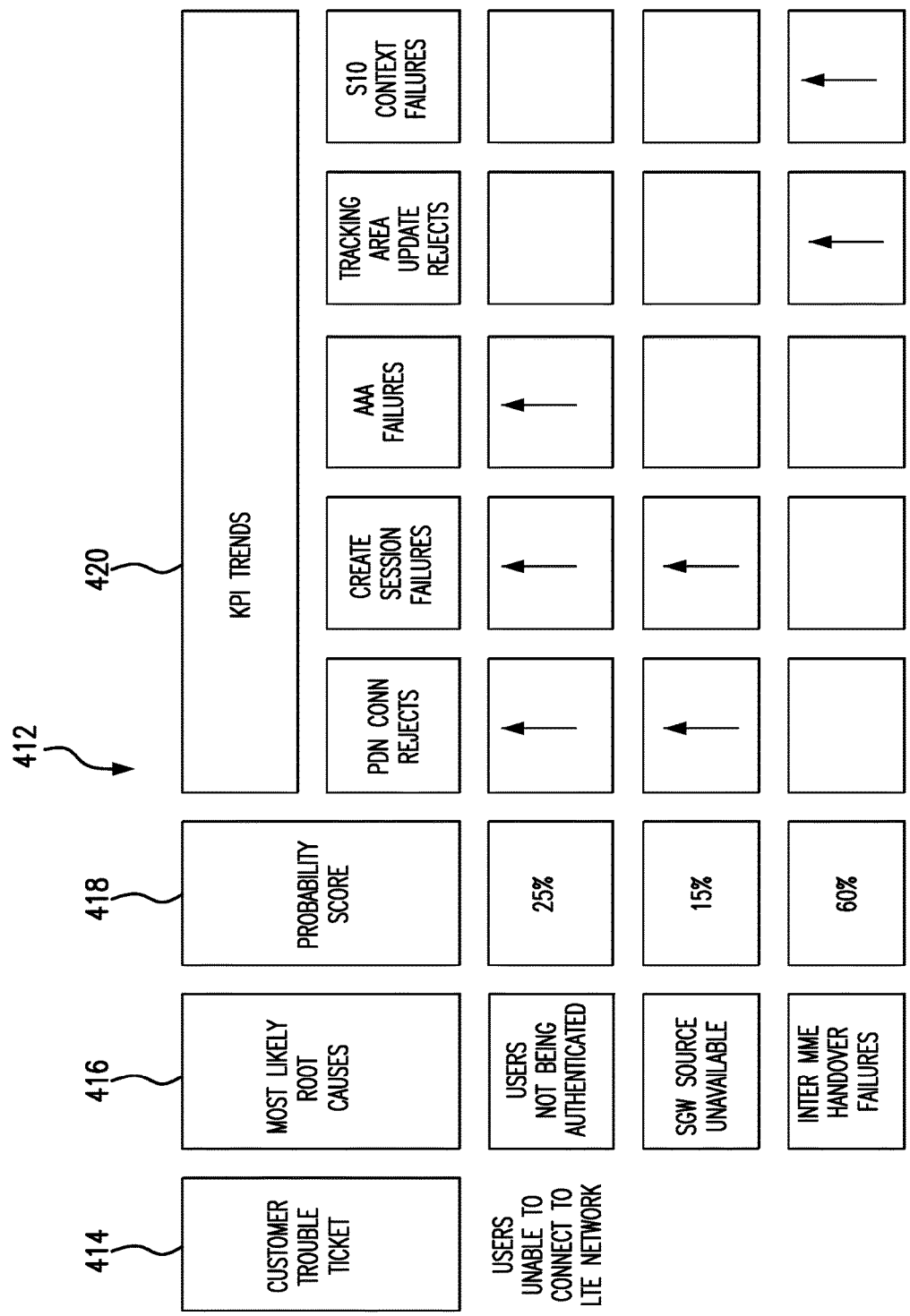
FIG. 4B illustrates exemplary output generated by a KPI root cause analyzer of FIG. 2, according to an embodiment of the present invention.

Thus, according to an embodiment of the present invention, KPI root cause analyzer 225 employs the KPI rules and scoring mechanism to automatically identify failure causes by correlating transactions and corresponding KPIs, thusly substantially eliminating the need for any manual analysis. Next, at step 310, KPI root cause analyzer 225 displays root cause analysis results 412 to a user via a user interface. FIG. 4B illustrates exemplary output generated by a KPI root cause analyzer 225, according to an embodiment of the present invention. In one illustrated embodiment, root cause analysis results may be presented to a user in a table format. Such analysis results table 412 may include, for example, information related to the customer specified network issue 414, identified potential root causes 416, probability scores corresponding to each potential root cause 418 and historical KPI trends 420. As explained above, potential root causes 416 are identified based on customized KPI rule set 410. Probability score values 418 define the probability of occurrence for each root cause. KPI trends 420 represent graphical trend indicators determined based upon historical information corresponding to each KPI of interest collected and processed over predefined periods of time. In one embodiment of the present invention, root cause analysis results 412 are presented to the user as a list of most likely root causes prioritized based on the calculated probability scores. In various embodiments, KPI root cause analyzer 225 may present root cause analysis results 412 in any form, graphical or non-graphical.

Advantageously, the disclosed embodiments of the present invention enable exclusively automatic troubleshooting of E2E (end-to-end) services. Furthermore, the disclosed embodiments provide network monitoring systems an ability to quickly triage a plurality of identified/detected network problems, which is quite valuable to the end users of such monitoring systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
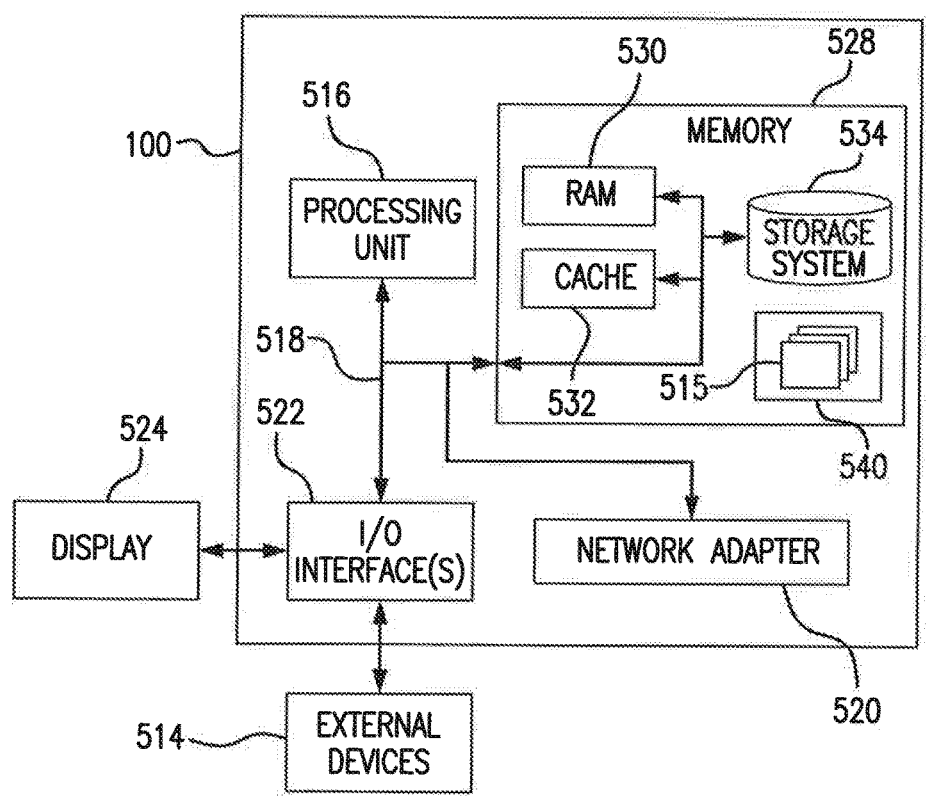
FIG. 5 is a block diagram of a computer system configured to implement various methods described herein according to some embodiments of the present invention.

Embodiments of the network monitoring system may be implemented or executed by one or more computer systems. One such computer system, the network monitoring system 100 is illustrated in FIG. 5. In various embodiments, network monitoring system 100 may be a server, a distributed computer system, a workstation, a network computer, a desktop computer, a laptop, or the like.

Network monitoring system 100 is only one example of a suitable system and is not intended to suggest any limitation as to the scope of use or functionality of embodiments of the invention described herein. Regardless, network monitoring system 100 is capable of being implemented and/or performing any of the functionality set forth hereinabove.

Network monitoring system 100 is operational with numerous other general purpose or special purpose computing system environments or configurations. Examples of well-known computing systems, environments, and/or configurations that may be suitable for use with the network monitoring system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of network monitoring system 100 may be described in the general context of computer system-executable instructions, such as program modules, being executed by a computer system. Generally, program modules may include routines, programs, objects, components, logic, data structures, and so on that perform particular tasks or implement particular abstract data types. Network monitoring system 100 may be practiced in distributed data processing environments where tasks are performed by processing devices that are linked through a communications network. In a distributed data processing environment, program modules may be located in both local and remote computer system storage media including memory storage devices.

The network monitoring system 100 is shown in FIG. 5 in the form of a general-purpose computing device. The components of network monitoring system 100 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network monitoring system 100 typically includes a variety of computer system readable media. Such media may be any available media that is accessible by network monitoring system 100, and it includes both volatile and non-volatile media, removable and non-removable media.

System memory 528 can include computer system readable media in the form of volatile memory, such as random access memory (RAM) 530 and/or cache memory 532. Network monitoring system 100 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515 (such as monitoring probe 205, monitoring engine 210, KPI rules engine 215 and KPI root cause analyzer 225) may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Network monitoring system 100 may also communicate with one or more external devices such as a keyboard, a pointing device, a display, etc.; one or more devices that enable a user to interact with network monitoring system 100; and/or any devices (e.g., network card, modem, etc.) that enable network monitoring system 100 to communicate with one or more other computing devices. Such communication can occur via Input/Output (I/O) interfaces 522. Still yet, network monitoring system 100 can communicate with one or more networks such as a local area network (LAN), a general wide area network (WAN), and/or a public network (e.g., the Internet) via network adapter 520. As depicted, network adapter 520 communicates with the other components of network monitoring system 100 via bus 518. It should be understood that although not shown, other hardware and/or software components could be used in conjunction with network monitoring system 100. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring system, the system comprising:
   a processor;
   a memory coupled to the processor;
   a database including a plurality of key performance indicator (KPI) records for monitoring a wireless communication system, wherein the plurality of KPI records corresponds to a plurality of different protocols;
   a rules engine configured and operable to store in the memory KPI rules associated with at least one rule set; and
   an analysis engine configured and operable to:
      identify, using the processor, one or more root causes of a failure for one or more of the transactions based on at least one KPI rule in the at least one rule set, wherein the at least one KPI rule correlates at least two of the plurality of KPI records across the plurality of different protocols and multiple interfaces;
      generate a threshold excess score for each of the at least two of the plurality of KPI records, the threshold excess score indicating a number of detected failures exceeding a predefined threshold;
      assign each generated threshold excess score a corresponding weight value to determine a weighted threshold excess score;
      generate a KPI score for each of the one or more identified root causes based on a sum of all weighted threshold excess scores associated with the at least two of the plurality of KPI records; and generate a probability score value for each root cause of the one or more identified root causes based on the generated KPI scores, the probability score comprising a ratio of the KPI score corresponding to the root cause to sum of all KPI scores of all of the one or more identified root causes.

2. The system as recited in claim 1, wherein the analysis engine is further configured and operable to prioritize the identified one or more root causes based on the generated probability score values.

3. The system as recited in claim 1, wherein the rules engine generates the at least one rule set using a natural language-like syntax and format.

4. The system as recited in claim 1, wherein the database is further configured and operable to export one or more of the plurality of KPI records to a data file in a predefined format based on a time period associated with the failure and/or based on one or more network elements of the wireless communication system associated with the failure.

5. The system as recited in claim 4, wherein the predefined format comprises at least one of: a Comma Separated Values (CSV) format, eXtensible Markup Language (XML) format, binary file format and flat file format.

6. A method for automatically identifying a root cause of a failure in a wireless communication system, the method comprising:

generating rules associated with a plurality of key performance indicator (KPI) records for monitoring a wireless communication system, wherein the plurality of KPI records corresponds to a plurality of different protocols;

identifying, by a processor, one or more failures in the wireless communication system;

identifying, by a processor, one or more likely root causes associated with the identified one or more failures by correlating at least some of the plurality of KPI records across multiple interfaces and across the plurality of different protocols based on the generated rules;

generating a threshold excess score for each of the at least two of the plurality of KPI records, the threshold excess score indicating a number of detected failures exceeding a predefined threshold;

assigning each generated threshold excess score a corresponding weight value to determine a weighted threshold excess score;

generating a KPI score for each of the one or more identified root causes based on a sum of all weighted threshold excess scores associated with the at least two of the plurality of KPI records; and generating a probability score value for each root cause of the one or more identified root causes based on the generated KPI score, the probability score comprising a ratio of the KPI score corresponding to the root cause to sum of all KPI scores of all of the one or more identified root causes.

7. The method as recited in claim 6, further comprising prioritizing the identified one or more root causes based on the generated probability score values.

8. The method as recited in claim 6, wherein generating rules comprises generating at least one rule set using a natural language-like syntax and format.

9. The method as recited in claim 6, further comprising exporting one or more of the plurality of KPI records to a data file in a predefined format a based on a time period associated with the failure and/or based on one or more network elements of the wireless communication system associated with the failure.

10. The method as recited in claim 9, wherein the predefined format comprises at least one of a Comma Separated Values (CSV) format, eXtensible Markup Language (XML) format, binary file format and flat file format.

11. A computer program product for automatically identifying a root cause of a failure in a wireless communication system, the computer program product comprising:

one or more non-transitory computer-readable storage devices and a plurality of program instructions stored on at least one of the one or more computer-readable storage devices, the plurality of program instructions comprising:

program instructions to generate rules associated with a plurality of key performance indicator (KPI) records for monitoring a wireless communication system, wherein the plurality of KPI records corresponds to a plurality of different protocols;

program instructions to identify one or more failures in the wireless communication system;

program instructions to identify one or more likely root causes associated with the identified one or more failures by correlating at least some of the plurality of KPI records across multiple interfaces and across the plurality of different protocols based on the generated rules;

program instructions to generate a threshold excess score for each of the at least two of the plurality of KPI records, the threshold excess score indicating a number of detected failures exceeding a predefined threshold;

program instructions to assign each generated threshold excess score a corresponding weight value to determine a weighted threshold excess score;

program instructions to generate a KPI score for each of the one or more identified root causes based on a sum of all weighted threshold excess scores associated with the at least two of the plurality of KPI records; and program instructions to generate a probability score value for each root cause of the one or more identified root causes based on the generated KPI score, the probability score comprising a ratio of the KPI score corresponding to the root cause to sum of all KPI scores of all of the one or more identified root causes.

* * * * *